(12) United States Patent
Walker

(10) Patent No.: US 6,274,880 B1
(45) Date of Patent: *Aug. 14, 2001

(54) FLUID LEVEL SENSING SYSTEM AND METHOD HAVING CONTROLLED SURFACE PAIRS

(75) Inventor: Ray Allen Walker, Eugene, OR (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/127,234

(22) Filed: Jul. 31, 1998

(51) Int. Cl.[7] .................................................. G01N 15/06
(52) U.S. Cl. ........................................ 250/577; 73/290 R
(58) Field of Search .................................... 250/577, 573, 250/904, 903; 340/618, 619; 73/290 R, 291; 356/379

(56) References Cited

U.S. PATENT DOCUMENTS

| | | | |
|---|---|---|---|
| 2,190,027 | 2/1940 | Jordan | 116/118 |
| 3,120,125 | * 2/1964 | Vasel | 250/903 |
| 3,192,392 | * 6/1965 | Reed | 250/577 |
| 3,448,616 | 6/1969 | Wostl et al. | 73/293 |
| 3,882,887 | * 5/1975 | Rekai | 250/903 |
| 4,038,650 | 7/1977 | Evans et al. | 340/244 R |
| 4,246,489 | 1/1981 | Yoshida et al. | 250/577 |
| 4,311,048 | 1/1982 | Merz | 73/293 |
| 4,443,699 | 4/1984 | Keller | 250/227 |
| 4,544,840 | 10/1985 | Keller | 250/227 |
| 4,745,293 | 5/1988 | Christensen | 250/577 |
| 4,783,599 | 11/1988 | Borden | 250/574 |
| 4,938,590 | 7/1990 | Ishida | 356/5 |
| 4,979,797 | 12/1990 | Nemeth . | |
| 4,994,682 | 2/1991 | Woodside | 250/577 |
| 5,164,605 | 11/1992 | Kidwell | 250/577 |
| 5,406,315 | 4/1995 | Allen et al. | 347/7 |
| 5,616,929 | 4/1997 | Hara | 250/573 |

FOREIGN PATENT DOCUMENTS

| | | |
|---|---|---|
| 0194732A2 | 9/1986 | (EP) . |
| 0573274A2 | 12/1993 | (EP) . |
| 0779156A1 | 6/1997 | (EP) . |
| 0860274A1 | 8/1998 | (EP) . |
| 0860284A2 | 8/1998 | (EP) . |

\* cited by examiner

*Primary Examiner*—Que T. Le
(74) *Attorney, Agent, or Firm*—Kevin B. Sullivan; Teri G. Andrews

(57) ABSTRACT

The present invention is a fluid level sensing system which has a single light source for providing light rays and a single light receiving device for receiving the light rays. The fluid level sensing system also has a fluid container which has a plurality of controlled surfaces arranged on the fluid container. Each controlled surface exhibits a first reflected light characteristic if fluid within the fluid container is in contact with the controlled surface and a second reflected light characteristic if the fluid is not in contact with the controlled surface. The controlled surfaces are disposed on the fluid container so that the light rays from the single light source impinge upon each of the controlled surfaces to produce either the first or the second reflected light characteristics and are thereby detected by the light receiving device to determine the fluid level in the fluid container.

9 Claims, 5 Drawing Sheets

FLUID LEVEL SENSING SYSTEM AND METHOD HAVING CONTROLLED SURFACE PAIRS

FIELD OF THE INVENTION

This invention relates to ink jet printers and, more particularly, to an ink jet printing system that makes use of the reflective characteristics of various portions of a fluid container to determine the level of ink in the fluid container.

BACKGROUND OF THE INVENTION

Ink jet printers include a drop ejection device and a supply of printing fluid for providing printing fluid such as ink to the ejection device. In the case of thermal ink jet printing, the drop ejection device is typically referred to as a printhead. Printing is accomplished by the selective actuation of the printhead as the printhead is moved relative to a print media. One common type of previously used ink jet printer uses a replaceable print cartridge which contains a printhead and a supply of ink contained within the print cartridge. This type of print cartridge is not intended to be refillable. When the initial supply of ink is depleted, the print cartridge is disposed of and a new print cartridge is installed.

Another type of ink jet printer makes use of an ink reservoir that is separately replaceable from the printhead. The replaceable reservoir can be positioned on a scanning carriage with the printhead or positioned off the scanning carriage. In the case where the ink cartridge is mounted off carriage, the ink cartridge can be continuously in fluid communication with the printhead such as connected by a flexible conduit or intermittently connected by positioning the carriage at a refilling station. The use of a replaceable ink container allows for the replacement of the ink container separate from the printhead allowing the use of the printhead until end of printhead life reducing the cost per page of printing.

Regardless of ink jet printer configuration, it is important that the system have an accurate means of indicating low ink levels to avoid the nuisance and resource waste of exhausting one of the ink supplies in the middle of a printing job. Moreover, it is important that the system stop printing when the ink cartridge is nearly empty. Allowing the ink jet printer cartridge to reach the state of complete ink exhaustion can result in operation of the thermal printhead without ink which can result in catastrophic damage and failure of the printhead.

One such ink level detector is disclosed in U.S. Pat. 5,616,929 to Hara where an optical ink detection section formed from a light transmitting material has an inclined interface and is formed integrally with the ink tank. Incident light from a light source is refracted when ink is present in the ink tank at the interface to make refraction light and does not emerge to a visual observation portion. When no ink is present, the incident light is totally reflected by the interface to make total reflection light, which can be visually observed. Hara teaches the use of a system that detects absence or presence of liquid ink based on the presence or absence of reflected light at a light receiving element. In order to detect ink levels at other discrete locations on the ink tank, a light source, a light receiving element, and a light interface is required at each desired ink detection section. This would be costly as well as space prohibitive in the inexpensive, small printers of the current technology.

There are clear advantages to having the ability to detect ink levels at numerous positions on the ink tank. For example, with large format printers which use a considerable amount of ink for covering large printing surfaces, the ability to compare ink requirements with ink remaining in the ink container prior to printing would be invaluable. In addition, providing more comprehensive feedback to the user of ink usage allows the user to better anticipate when the ink containers will require replacing.

SUMMARY OF THE INVENTION

The present invention is a fluid level sensing system which has a single light source for providing light rays and a single light receiving device for receiving the light rays. The fluid level sensing system also has a fluid container which has a plurality of controlled surfaces arranged on the fluid container. Each controlled surface exhibits a first reflected light characteristic if fluid within the fluid container is in contact with the controlled surface and a second reflected light characteristic if the fluid is not in contact with the controlled surface. The controlled surfaces are disposed on the fluid container so that the light rays from the single light source impinge upon each of the controlled surfaces to produce either the first or the second reflected light characteristics and are thereby detected by the light receiving device to determine the fluid level in the fluid container.

Another aspect of the present invention is an ink jet printing system which has an ink level sensing device which has an energy emitting portion and an energy receiving portion. The ink jet printing system also has a plurality of ink jet printheads for selectively depositing ink on print media. Each of the inkjet printheads is associated with one of a plurality of ink containers. Each of the ink containers provides the ink to the corresponding ink jet printhead. Each of the ink containers includes a controlled surface indicative of an ink level within the ink container. The ink jet printing system has means for moving the ink level sensing device relative to the plurality of ink containers. The energy emitting portion emits energy that selectively impinges each of the controlled surfaces and is received by the energy receiving portion to selectively determine ink level in each of the ink containers.

DETAILED DESCRIPTION OF A PREFERRED EMBODIMENT

Figure 1:
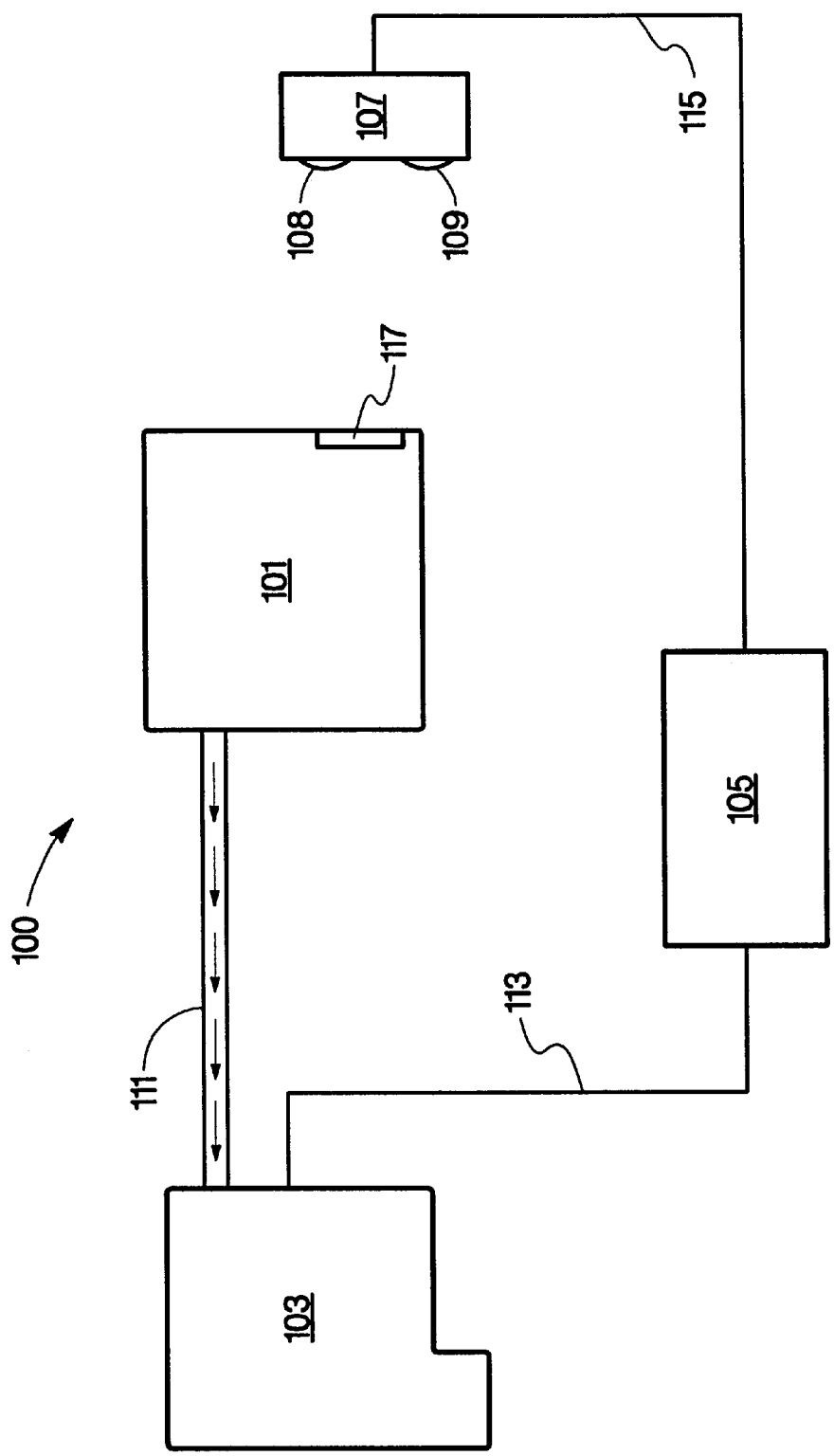
FIG. 1 depicts a schematic representation of a printing system that includes an ink container and an ink level detection device of the present invention.

FIG. 1 depicts a schematic representation of a printing system 100 that uses an ink an ink level detection device 107 of the present invention. Printing system 100 includes an ink container 101, a printhead 103 fluidically connected to ink container 101 by a fluidic conduit 111 and a printer controller 105. The printer controller 105 is connected to ink level detection device 107 by a first link 115 and to printhead 103 by a second link 113.

The ink container 101 provides ink by way of fluidic conduit 111 to printhead 103. The printhead 103 is typically mounted in a scanning carriage (not shown). By selectively activating the printhead 103, ink is ejected from printhead 103 to form images on print media. The ink container 101 replenishes the printhead 103 and is ejected.

The printer controller 105 in conjunction with first link 115 and ink level detection device 107 are used to determine the quantity of ink remaining in ink container 101. Ink level detection device 107 as shown in FIG. 1 comprises a single light source 108 that projects light upon detection area 117 whereby a single light receiving device 109 receives an amount of light reflected at detection area 117 that is indicative of the level of ink in ink container 101. This ink level information is provided to the printer controller 105 by way of the first link 115. The printer controller 105 determines if a low ink condition has occurred and notifies the user of such a condition. Ink level information may be continuously forwarded to the user to provide a continuous update of ink level information. Alternately, ink level information may be forwarded to the user upon request from the user. Appropriate action can be taken by the user such as acquiring proper replacement ink supplies. It is preferable that the user be notified prior to an out of ink condition so that the ink container 101 can be replaced prior to running out of ink or printing an image for which there is insufficient ink to complete.

The first link 115 is preferably an electrical conductor, fiber optic conduit or some conventional means for transferring information between the ink level detection device 107 and the printer controller 105. The printer controller 105 is a device that either queries the ink level detection device 107 to determine if a particular ink level condition has occurred or waits until a signal indicative of a particular ink level condition is received. The printer controller 105 is implemented as hardwired logic, a microprocessor or programmable controller or some conventional device suitable for performing the printer controller 105 function. For example, once a low ink level condition has occurred, the printer controller 105 provides some form of indicia to the user indicating that a low ink level condition has occurred. Another example would be for the printer controller 105 to query the ink level detection device 107 at the onset of a printing job to assure the user that there is an adequate quantity of ink in the ink container 101 to print the commanded job.

Figure 2:
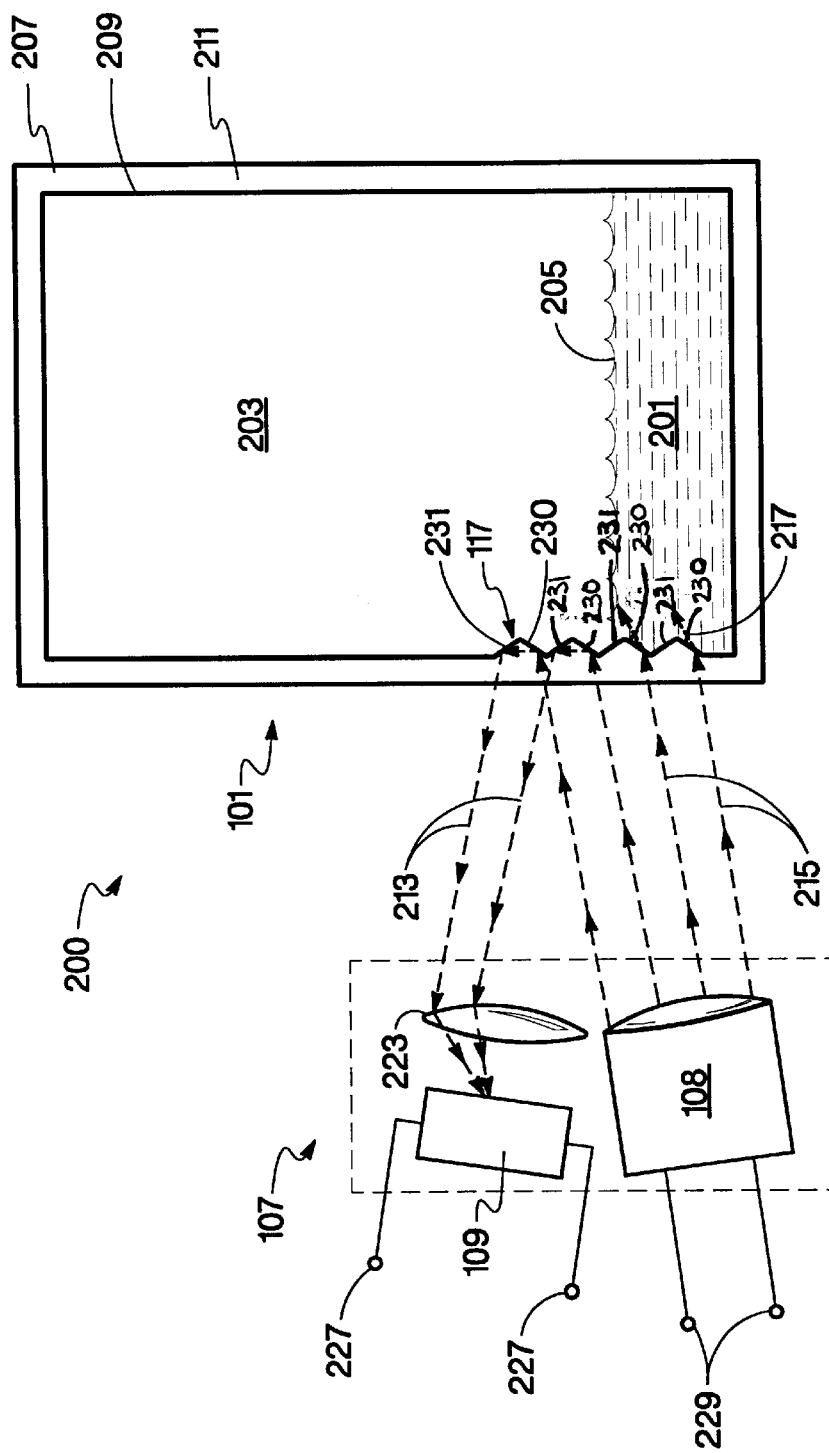
FIG. 2 depicts a schematic representation of a partially filled ink container having a detection area and an ink level detection device for detecting ink level in the detection area.

FIG. 2 depicts a schematic representation of a partially filled ink container 101 having a detection area 117 and an ink level detection device 107 for determining an ink level 205 over a wide range of ink levels in the ink container 101 adjacent to the detection area 117. In this preferred embodiment of the present invention, ink container 101 is shown having a housing 211 which has an inner housing surface 209 and an outer housing surface 207. The detection area 117 is disposed and arranged on the inner housing surface 209 in an area of ink level interest to the user. In the shown preferred embodiment, this area is in the lower portion of the ink container 101 where the last remaining ink in the ink container 101 tends to accumulate. It has also been contemplated to expand the detection area 117 to monitor the entire height of ink container 101 in the event this information would be valuable to either the printing system or the user.

In the preferred embodiment of the present invention as shown in FIG. 2, the detection area 117 comprises a plurality of controlled surfaces 230 paired with and at an angle from a plurality of second controlled surfaces 231 wherein a plurality of light rays 215 from the single light source 108 impinge upon each of the plurality of controlled surfaces 230. In the case where ink 201 is in contact with the controlled surface 230, the light rays 215 will defract into the ink 201 as illustrated by a plurality of defracted light rays 217. In the alternate case where ink 201 is not in contact with the controlled surface 230, the light rays 215 reflect onto the second controlled surfaces 231 and return as a plurality of reflected light rays 213 into a light collecting lens 223 attached to the single light receiving device 109. The amount of the reflected light rays 213 or intensity of reflected light received by the single light receiving device 109 is indicative of the ink level 205 in ink container 101. For example, with ink container 101 full of ink 201, all of the incident light rays 215 on controlled surface 230 defract into ink 201 and little or no light intensity is returned to single light receiving device 109. With the ink level 205 below the lowest controlled surface 230, a maximum quantity or intensity of reflected light 213 returns to single light receiving device 109.

The ink level 205 in FIG. 2 is shown to be approximately midway between the top of detection area 117 and the bottom of detection area 117. As a result, approximately one half of emitted light rays 215 will detract into ink 201 while the other half will reflect back to the single light receiving device 109 as reflected light rays 213. This received level of light intensity when reported to the printer controller 105 enables the printer controller 105 to closely estimate the remaining amount of ink 201 in ink container 101.

Although ink level detection device 107 is shown as a three component device with single light source 108, single light receiving device 109 and light collecting lens 223. These components may be integrated into a single unit. In addition, an optical lens may or may not be required to collect or dispense light.

The controlled surfaces of the detection area 117 are not necessarily in a paired, angular configuration, as shown in FIG. 2, but can be a plurality of adjacent controlled surfaces parabolically arranged down the side of the ink container 101. Each of the plurality of controlled surfaces receive energy from an energy source component of the ink level detection device 107 and reflect energy to an energy receiving component of ink level detection device 107. The incident energy that does not refract into ink 201 would return as reflected energy to ink level detection device 107 creating varying energy intensities indicative of the ink level 205. For example, the lower the ink level in ink container 101, the more controlled surfaces are void adjacent ink, and consequently higher energy intensity is received by the energy receiving component. This is just one example of how to use a combined energy source and detector. Other arrangements are also possible.

Figure 3:
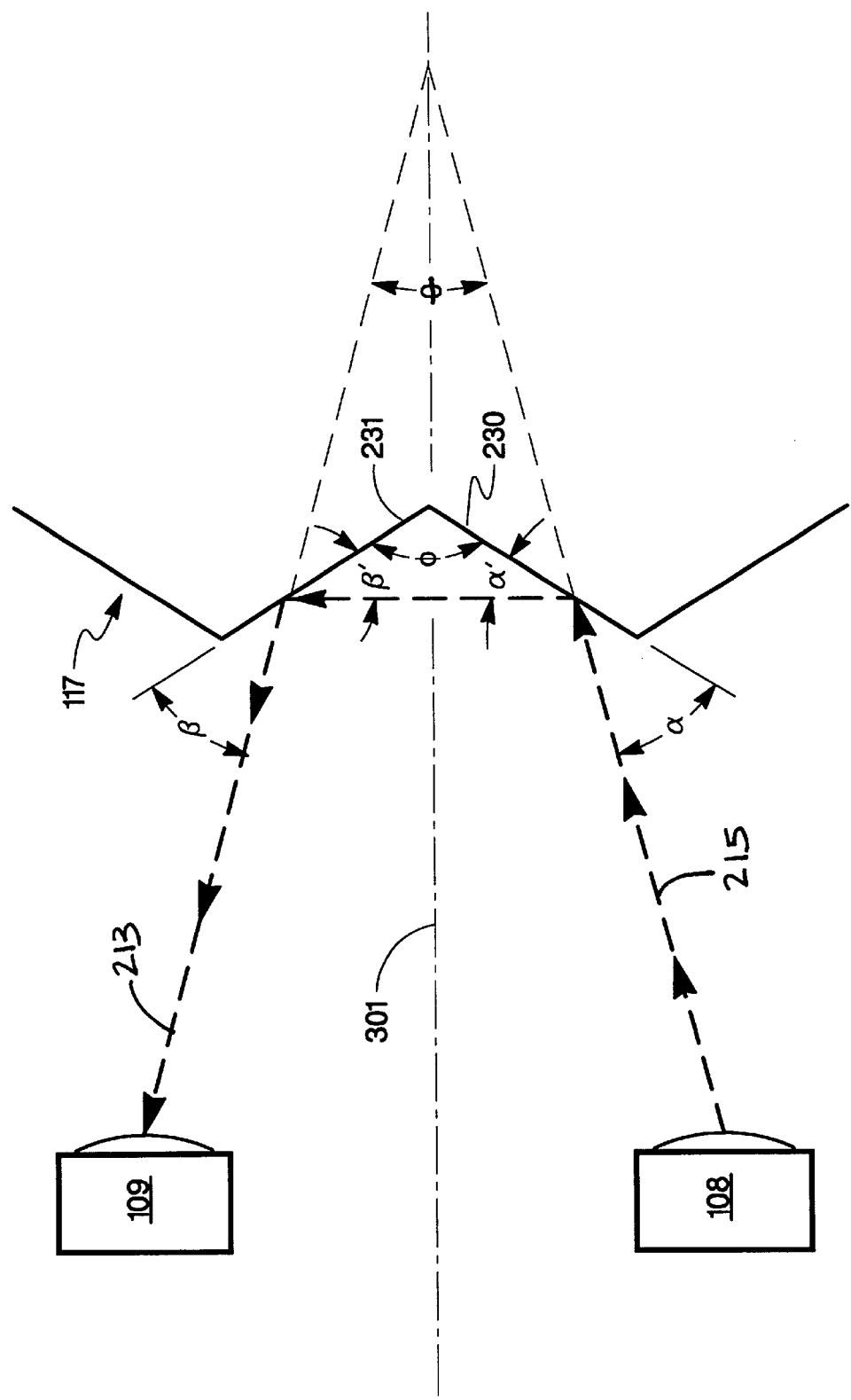
FIG. 3 is a schematic representation of one section of the detection area shown greatly enlarged to illustrate on an ink container an angular relationship between an incident surface and a reflective surface.

FIG. 3 is a schematic representation of one section of the detection area 117 shown greatly enlarged for illustrative purposes. It should be noted that the positioning and spacing of FIG. 3 are for illustrative purposes and are not intended to be accurate. FIG. 3 is looking at a single light ray of the preferred embodiment only to illustrate the principle of the invention. An angular relationship exists between a controlled surface 230, a second controlled surface 231, and the corresponding interrelated angular relationship with the positioning of the single light source 108 and the single light receiving device 109.

With the arrangement of single light source 108, single light receiving device 109, controlled surface 230, and second controlled surface 231 as shown in FIG. 3, the angle φ is created by controlled surface 230 abutted to and at an angle from second controlled surface 231. The light rays 215 emitted from the single light source 108 are incident on controlled surface 230 at an angle α. Upon reflection from controlled surface 230, the angle of reflection, α', is equal to angle α. Similarly, the light incident on second controlled surface 231, at an angle β' is equal to the angle of reflection, β, of reflected light ray 213 from second controlled surface 231.

In the FIG. 3 illustrative example, a α=α'=β=β'. However, it is important to note that the initial angle of incidence, α, can vary and the resultant angle, α', will be equal to angle α. The triangle created by angles α', β', and φ controls the relationship between α' and β' in that the sum of α', β', and φ will always be 180°. Hence, β'=180°−φ−α'. The significance of this relationship is that precise alignment of single light source 108 and single light receiving device 109, with respect to the controlled surfaces 230 and 231, may be different such as in the case where light is reflected off a single reflective surface in a light path between the light source 108 and light receiving device 109. The present invention relates to detecting varying intensities of energy, which is calibratable, indicative of varying levels of ink present in ink container 101 based on the reflection or defraction of a plurality of parallel light rays 215 in the detection area 117. In Hara, an absence or presence of total reflection is observed at a point of interface in order to detect an absence or presence of ink at that interface. This will require a more precise alignment and positioning of the Hara optical devices.

The angle of separation between single light source 108 and single light receiving device 109 is depicted as the angle θ. In order to have this interrelated, angular relationship the following must conditions must exist:

$$\phi=(\theta/2)+90°;$$

where $$\alpha=\alpha' \text{ and } \beta=\beta'$$

An alternate embodiment is contemplated where single light source 108 and single light receiving device 109 are aligned as a single ink level sensing device 107 wherein the angle θ=0°, the angle φ=90° and α=α'=β=β'=45°. In this embodiment the light emitted from single ink level sensing device 107 would be a plurality of parallel rays incident on the entire surface of detection area 117.

Figure 4:
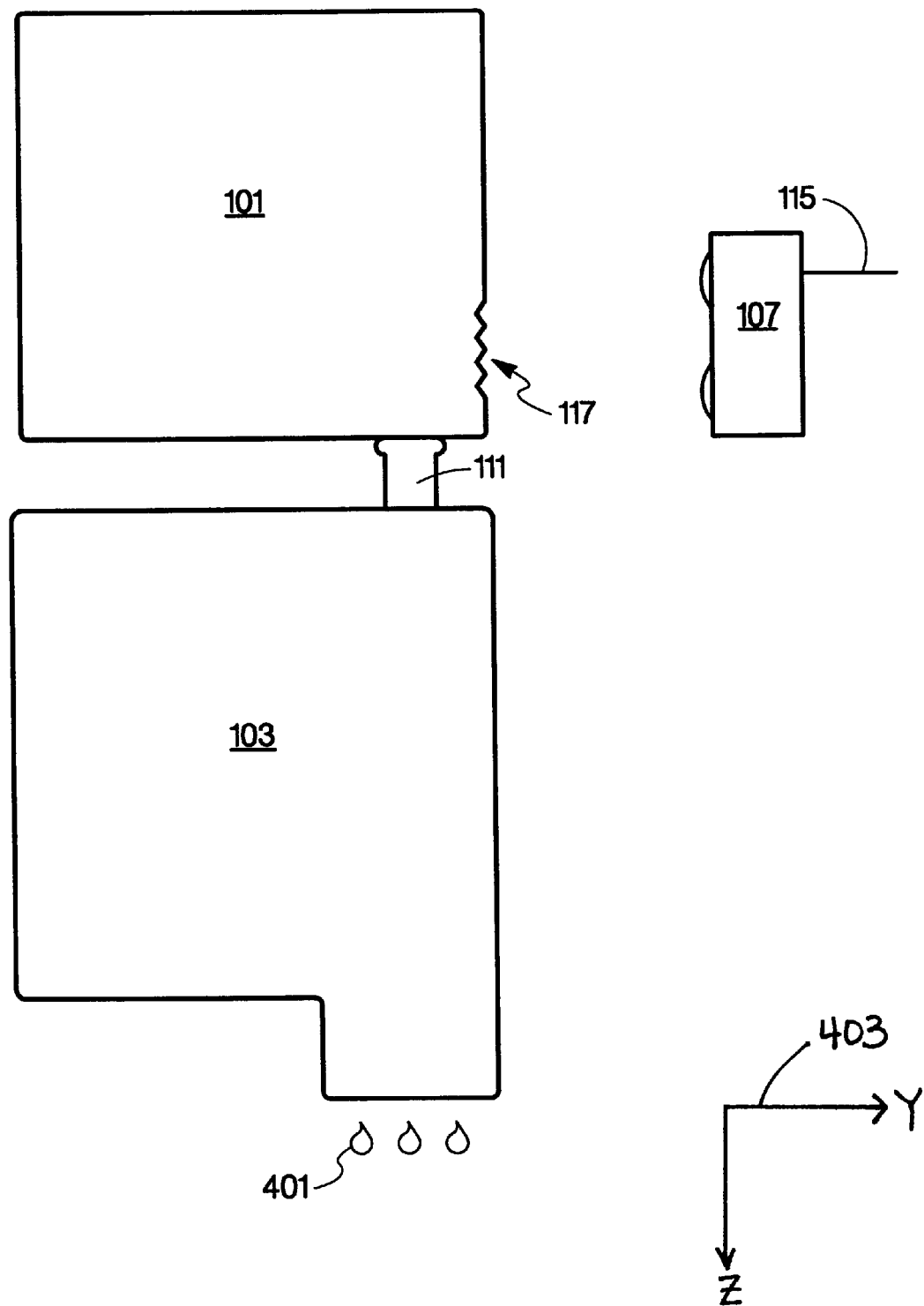
FIG. 4 depicts a schematic representation of a side plan view of the ink container positioned in fluid communication with the ink jet printhead and with the ink level detection device positioned to determine ink level.

FIG. 4 depicts a schematic representation of a side plan view of one embodiment of the present invention having a coordinate system 403. As shown, coordinate system 403 has a Z-axis and a Y-axis with an X-axis (not shown) pointing into the page. The ink container 101 is removably mounted to and in fluid communication with the printhead 103 via a fluidic conduit 111. The ink container 101 and printhead 103, in this embodiment, are mounted together in a printer carriage (not shown) and traverse along the X-axis of coordinate system 403 with the print media moving in the Y-axis direction. Printhead 103 is in communication with printer controller 105 (FIG. 1) by way of link 113 whereby printhead 103 ejects a plurality of ink droplets 401 in the Z-axis direction onto a print media (not shown) below upon command from printer controller 105.

A detection area 117 is an integral part of the ink container 101 and is disposed in an area of low to empty ink level conditions. In the embodiment shown in FIG. 4, ink level detection device 107 is mounted off carriage within the printer housing (not shown) so that the carriage moves past the ink level detection device 107. As the carriage containing the detection area 117 moves past the detection device 107, the detection area 117 is analyzed. Ink level detection device 107 communicates to printer controller 105 (FIG. 1) by way of link 115 an energy level, as previously described in FIG. 2, detected at detection area 117 indicative of the ink level in ink container 101.

An alternate embodiment makes use of an ink container 101 that is fixed within the printer housing and the printhead 103 contains a small ink reservoir. The ink container 101 can be either in continuous fluid communication with the printhead such as by a flexible conduit or intermittently connected by positioning the carriage at the ink container 101 acting as a refilling station. The ink container 101 is positioned relative to the detection device 107 so that ink level information can be constantly monitored.

Another alternate embodiment makes use of a printhead 103 that includes an internal ink reservoir whereby the detection area 117 is an integral part of the printhead 103. In this embodiment, the ink level detection device 107 is incident upon an area on the printhead that allows the level of ink to be detected by ink level detection device 107.

Figure 5:
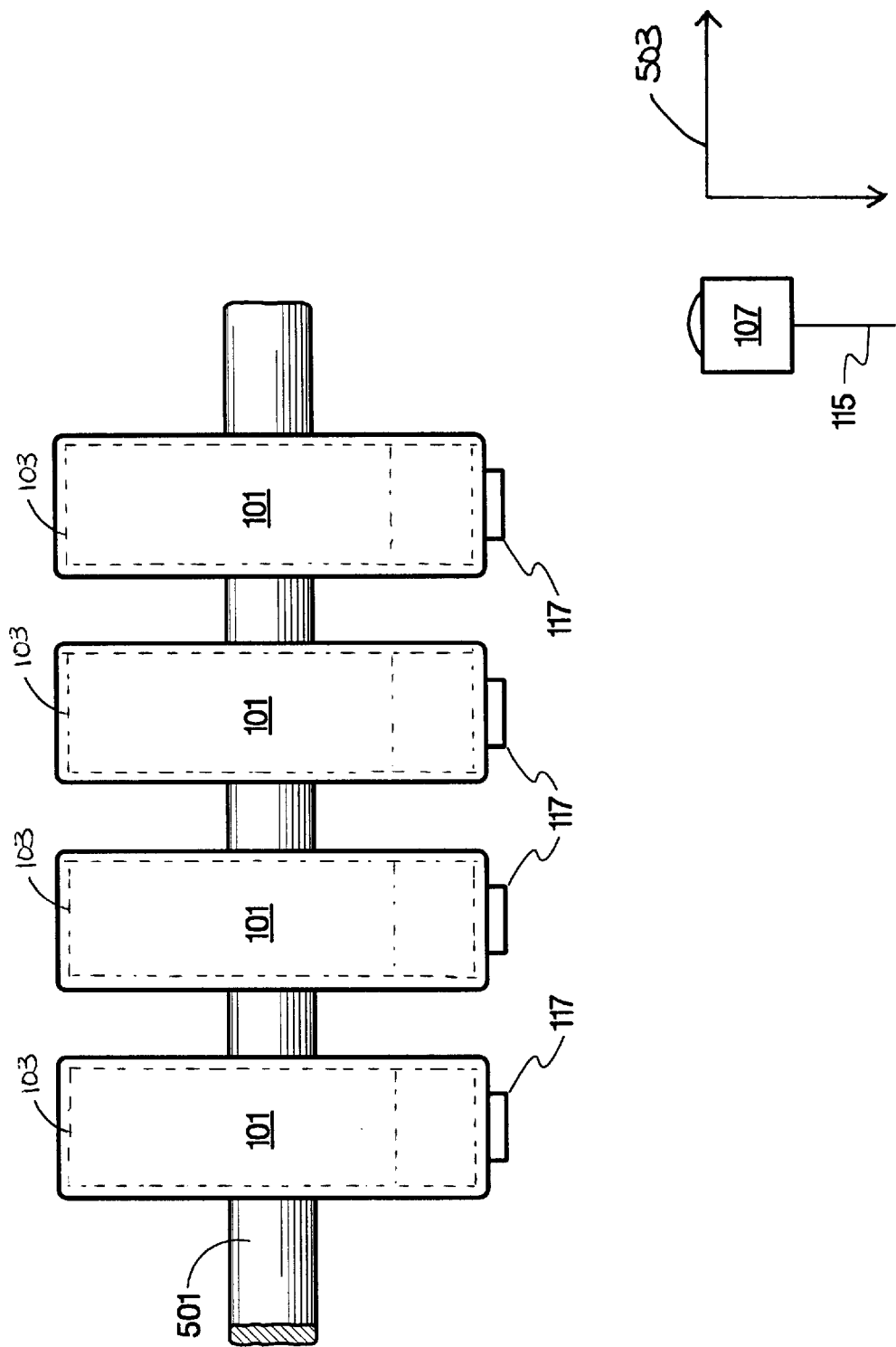
FIG. 5 depicts a schematic representation of a top plan view of four ink jet printheads in a carriage (not shown), the carriage moves on a rail with the ink level detection device positioned so that the ink levels of each ink container can be determined as it passes by the detection device.

FIG. 5 depicts a schematic representation of a top plan view of four ink containers 101 having printheads 103 (shown in phantom lines) fluidly connected, as shown in FIG. 4, and mounted in a printer carriage (not shown). As shown, coordinate system 503 has an X-axis and a Y-axis with a Z-axis (not shown) pointing into the page. In the embodiment shown, the printer carriage moves on a rail 501 along the X-axis. The print media moves along the Y-axis.

The ink level detection device 107 is positioned so that the detection area 117 of each ink container 101 can be selectively analyzed as it passes by the ink level detection device 107 to selectively determine the ink level 205 (FIG. 2) in each of the ink containers 101.

In an alternate embodiment, the ink containers 101 are stationary on an axis removed from the printheads 103 which traverse along the X-axis, and the ink level detection device 107 moves relative to the plurality of ink containers 101 thereby selectively determining the ink level in each ink container 101.

The present invention is both a low cost and simplistic method for detecting fluid level in an ink containment device as the ink container 101 has no added detection device components other than controlled surfaces 230 incorporated into the molded material housing 211 of the ink container 101. Moreover, the ability to use one ink level detection device 107 for a plurality of ink containers 101 both decreases manufacturing costs as well as consumes minimal space in the printer carriage area. Finally, the present invention does not only detect ink level at a selected position, but detects ink levels at graduated positions along the ink container allowing the user to always have confidence that his commanded print job has sufficient ink to complete.

What is claimed is:

1. A fluid level sensing system, comprising:
   a single light source for providing light rays;
   a single light receiving device for receiving said light rays emanating from said single light source; and
   a fluid container having a plurality of controlled surface pairs arranged vertically along an interior wall of said fluid container, each controlled surface having a first reflected light characteristic when a fluid within said fluid container is in contact with said controlled surface, and a second reflected light characteristic when said fluid is not in contact with said controlled surface;

wherein each of said plurality of controlled surface pairs is disposed on said fluid container so that said light rays from said single light source impinge upon said plurality of controlled surface pairs, each controlled surface pair producing one of said first or said second reflected light characteristics for detection by said single light receiving device to determine said fluid level in said fluid container.

2. The fluid level sensing system of claim 1 wherein said single light source and said single light receiving device are combined into a single fluid level detection device that both emits and receives said light rays.

3. The fluid level sensing system of claim 1 wherein each of said controlled surface pairs includes a first control surface and a second control surface, each first controlled surface being paired with, abutted to, and at an acute angle from a corresponding second control surface whereby said light rays upon reflection from said first controlled surfaces, reflect onto said second controlled surfaces to produce a plurality of reflected light rays into said single light receiving device.

4. The fluid level sensing system of claim 1 wherein said light receiving device receives a light intensity representing a sum of reflected light rays from each of said plurality of controlled surface pairs to produce a signal indicative of ink level in said fluid container.

5. The fluid level sensing system of claim 1 wherein said fluid container is a plurality of ink containers, each ink container having a plurality of controlled surface pairs, and wherein said single light receiving device is moved relative to said plurality of ink containers so that said single light source emits said light rays that selectively impinges on said controlled surface pairs and is received by said single light receiving device to selectively determine ink level in each of said plurality of ink containers.

6. An ink jet printing system, comprising:

an ink level detection device having an energy emitting portion and an energy receiving portion;

a plurality of ink jet printheads for selectively depositing an ink on print media;

plurality of ink containers, each of said ink containers being associated with an inkjet printhead of said plurality of inkjet printheads for providing said ink to said corresponding ink jet printhead with each of said plurality of ink containers having a plurality of controlled surface pairs arranged vertically along an interior side wall of the ink container; and means for moving said ink level sensing device to said plurality of ink containers so that said energy emitting portion emits energy that selectively impinges each of said controlled surface pairs and is received by said energy receiving portion to selectively determine ink level information from each of said plurality of ink containers.

7. The ink jet printing system of claim 6 wherein each controlled surface has a first reflected light characteristic when said ink, within said ink container, is in contact with said controlled surface and a second reflected light characteristic when said ink is not in contact with said controlled surface.

8. An ink containment device for use with an ink jet printing system, said ink containment device including:

a housing for containing an ink, said housing having an interior wall;

a plurality of controlled surface pairs disposed along said interior wall of said housing, each controlled surface of said plurality of controlled surface pairs having a first reflected light characteristic when said ink is in contact with said controlled surface and a second reflected light characteristic when said ink is not in contact with said controlled surface; and wherein each of said plurality of controlled surface pairs is disposed and arranged on said housing so that incident light rays impinging upon each of said plurality of controlled surface pairs produce one of said first or said second reflected light characteristics having a combined light intensity value based on ink level in said ink containment device.

9. A method for detecting a fluid level in a fluid container, said method comprising:

providing said fluid container wherein a plurality of controlled surface pairs of said fluid container are disposed vertically along an interior side wall of said fluid container, said plurality of controlled surface pairs being within detecting range of a fluid level sensing device;

emitting light rays incident on said plurality of controlled surface pairs;

reflecting said light rays off of each controlled surface wherein said fluid is not in contact with said controlled surface and returning said light rays as a plurality of reflected light rays back to a single light receiving device of said fluid level detecting device;

diffusing said light rays into said fluid wherein said fluid is in contact with said controlled surface;

determining said fluid level by said fluid level sensing device analyzing a total amount of said reflected light rays received by said light receiving device; and sending a signal to a control device reporting said fluid level.

* * * * *

UNITED STATES PATENT AND TRADEMARK OFFICE
CERTIFICATE OF CORRECTION

PATENT NO. : 6,274,880 B1
DATED : August 14, 2001
INVENTOR(S) : Ray Allen Walker It is certified that error appears in the above-identified patent and that said Letters Patent is hereby corrected as shown below:

Title page, Item [54] and Column 1, lines 1-3,
The title should read -- FLUID LEVEL SENSING SYSTEM AND METHOD --.

Signed and Sealed this

Twenty-fourth Day of December, 2002

JAMES E. ROGAN
*Director of the United States Patent and Trademark Office*